(12) United States Patent
Korinek

(10) Patent No.: US 6,198,049 B1
(45) Date of Patent: Mar. 6, 2001

(54) TORQUE LIMITING SOCKET FOR TWIST-ON WIRE CONNECTORS

(75) Inventor: Chris W. Korinek, Cedarburg, WI (US)

(73) Assignee: GB Electric, Inc., Milwaukee, WI (US)

( * ) Notice: Subject to any disclaimer, the term of this patent is extended or adjusted under 35 U.S.C. 154(b) by 606 days.

(21) Appl. No.: 08/571,323

(22) Filed: Dec. 12, 1995

(51) Int. Cl.[7] ...................................................... H01R 4/22
(52) U.S. Cl. .............................. 174/87; 7/107; 81/121.1; 81/124.3
(58) Field of Search .................................... 174/87, 84 S; 29/758; 7/107; 81/121.1, 124.3, 122, 431; D13/150

(56) References Cited

U.S. PATENT DOCUMENTS

| D. 315,139 | 3/1991 | Blaha ................................... D13/150 |
| D. 315,143 | 3/1991 | Blaha ................................... D13/150 |
| 845,717 | * 2/1907 | Miller . |
| 3,908,488 | * 9/1975 | Andersen ............................ 81/121 R |
| 4,288,657 | 9/1981 | Swanson ................................. 174/87 |
| 4,384,812 | * 5/1983 | Miyagawa ........................ 411/410 X |
| 4,691,079 | 9/1987 | Blaha ...................................... 174/87 |
| 4,883,921 | 11/1989 | Legerius et al. ....................... 174/87 |
| 4,930,378 | * 6/1990 | Colvin ................................. 81/121.1 |
| 5,012,706 | * 5/1991 | Wright et al. ....................... 81/121.1 |
| 5,284,073 | * 2/1994 | Wright et al. ....................... 81/121.1 |
| 5,388,486 | * 2/1995 | Ruzicka et al. ..................... 81/124.3 |
| 5,476,024 | * 12/1995 | Hsieh ................................. 81/121.1 |

\* cited by examiner

*Primary Examiner*—Kristine Kincaid
*Assistant Examiner*—Chau N. Nguyen
(74) *Attorney, Agent, or Firm*—Quarles & Brady; George E. Haas

(57) ABSTRACT

Ends of several electrical wires are joined by a connector which is twisted onto the wire to a predefined torque level by using a unique tool socket. The connector has a body with closed end and an open end for receiving the electrical wires. At least a portion of the hollow body has an equilateral polygonal cross section shape formed by side surfaces which meet at corner sections. The tool socket includes a coupling through which torque is applied and has an aperture for receiving the connector. The aperture has a cross-sectional shape such that the tool socket engages only the connector corner sections and a space exists between the connector side surfaces and the socket. That engagement concentrates torque applied by the tool socket to the connector which causes the corner sections to round upon application of more than the predefined torque level, thus preventing excessive torque from being applied to the connector and the wires.

7 Claims, 2 Drawing Sheets

TORQUE LIMITING SOCKET FOR TWIST-ON WIRE CONNECTORS

BACKGROUND OF THE INVENTION

The present invention relates to connecting electrical wires with twist-on type connectors; and more particularly, to tools for fastening such connectors.

The ends of two or more wires of an electrical circuit are often connected together using a twist-on type wire connector. These connectors are available in a variety of sizes and shapes and commonly have a conical shaped body of insulating material, such as plastic, with an opening at the larger end. The opening communicates with a tapered aperture which has helical threads cut in the interior surface of the body. The fastening operation is performed by inserting the stripped ends of two or more wires into the open end and rotating the connector so that the threads screw onto and twist the wires together to form an electrical coupling. An improved connector has a tapered metal spring inserted into the aperture of the insulating body. The spring engages the bare wires and aids in providing a conductive path there between.

Twist-on type wire connectors frequently are used by electricians to connect two or more wires in a junction box within a building. In this application, electricians typically twist on the connectors by hand, although manual tools, such as a hexagonal socket wrench or a nut driver, can be used. These connectors also are employed in a variety of electrical appliances. For example, connections between the wires of a ballast in a fluorescent lighting fixture and the electrical supply cord are made in this manner. In a factory, the wire connectors often are attached using a pneumatically or electrically powered nut driver because of the high volume assembly at a fixed location. These power tools have a socket specifically designed to engage the body of the connector.

A fastening tool, especially an power-driven one, easily can apply an excessive amount of torque to the connector, thus damaging either the wires or the connector. If cracks in the connector are undetected, a short circuit could occur at the connection.

One solution to this problem was to limit the torque with a clutch mechanism between the tool motor and the socket. However, torque limiting devices add additional expense, size and weight to the tool, and require adjustment to the optimum level for each specific wiring application.

SUMMARY OF THE INVENTION

A general object of the present invention is to provide a manual or power driven fastening tool for a twist-on wire connector.

Another object is to provide a wire connector fastening tool which self-limits the amount of torque that can be applied to the connector during the fastening operation.

These and other objectives are fulfilled by a system for joining ends of electrical wires to a predefined torque level, which comprises a twist-on connector and a tool socket specifically designed to cooperate in limiting the amount of torque that the socket is able to apply to the connector. The connector includes a hollow body with an open end in which to receive the wires, a closed end and an outer surface extending between the open and closed ends. At least a portion of the outer surface has elements which form a cross section with a polygonal shape. For example, that portion of the body has side surfaces meeting at outside corners to form a hexagonal cross section.

The tool socket includes a coupling by which torque is applied to the tool socket by a driver. An aperture is provided in the tool socket to removably receive the closed end of the connector with side walls of the aperture engaging the portion of the connector's outer surface. The aperture is significantly larger in cross section than the connector so that a gap exists between the side walls and the outer surface. For example, the aperture may have a polygonal cross section with portions of the side walls between the polygon corners being directed away from the connector to form the gap. The gap results in the transfer of torque between the socket and the connector being concentrated at the outside corners of the connector. This torque concentration causes the elements of the connector, such as the outside corners of the polygon, to deform when the tool socket applies greater than the predefined torque level to the connector. After that deformation, the socket turns freely about the connector inhibiting additional torque from being applied.

DETAILED DESCRIPTION OF THE INVENTION

Figure 1:
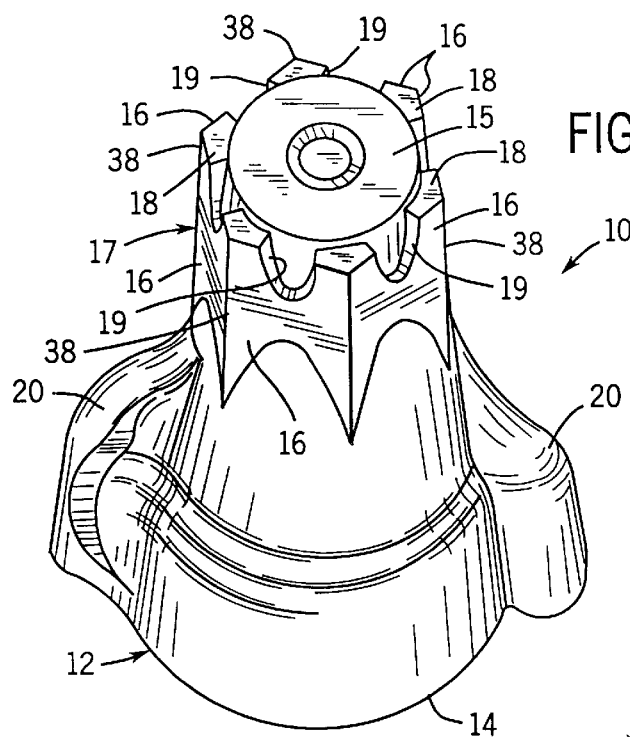
FIG. 1 is an isometric view of a twist-on wire connector of a type which can be used with the present invention.

Referring to FIG. 1, a twist-on wire connector 10 is formed of a hollow body 12 having a general shape of a truncated cone. The body 12 preferably is formed of molded plastic and has an open end 14 which tapers to a smaller diameter closed end 15. As the outer surface of the body 12 tapers toward the closed end 15, a transition occurs to six flat surfaces 16. These flat surfaces 16 define a portion 17 of the body that has an equilateral hexagonal cross-section for engagement by a wrench or socket for fastening the connector 10. Although the exemplary wire connector 10 has a hexagonal portion 17 various numbers of flat surfaces 16 may be provided to form a body portion with different polygonal shapes for tool engagement. Each flat surface 16 terminates at an edge 18 near the closed end 15 and a conical tip extends from those edges at the closed end.

The wire connector 10 also includes a pair of wings 20 which project radially from the body adjacent open end 14. The radially inner portion of the wings 20 provide exterior longitudinal reinforcement thereby preventing the body 12 from collapsing. The wire connector 10 is fastened onto wires by turning it in the clockwise direction in the orientation illustrated. The curved surface of each wing 20 has grooves which enable the fingers of a user to grip the wire connector during the turning operation.

Figure 2:
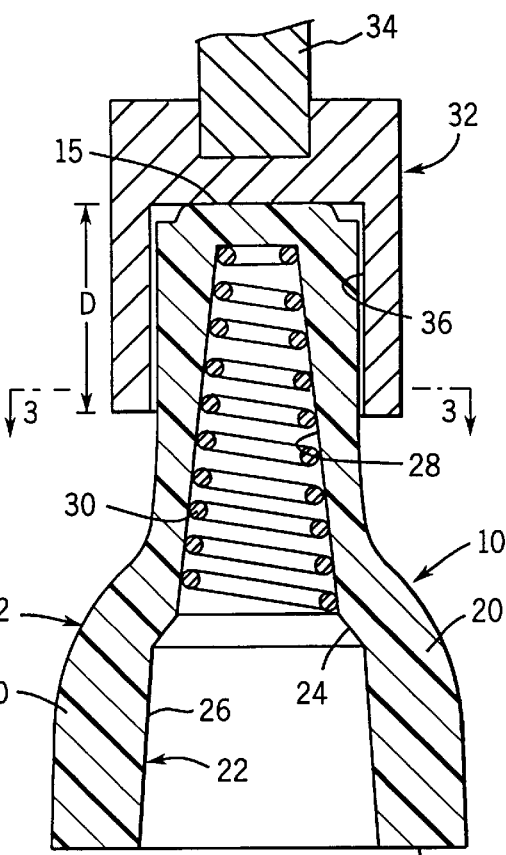
FIG. 2 is an axial cross-sectional view through the wire connector with a fastening socket attached thereto.

With reference to FIG. 2, the open end 14 of the wire connector has a circular aperture 22 extending axially into the body 12 and terminating a short distance from the closed end 15. The aperture 22 tapers in a narrowing manner reaching a shoulder 24 approximately one-third the depth of the aperture. The shoulder 24 defines an outer portion 26 of the aperture 22 and a smaller diameter inner portion 28. A tapered coil spring 30 made of electrically conductive metal is wedged into the smaller inner portion 28.

In use, the stripped ends of two or more wires are inserted into the aperture 22 at the open end 14 of the connector 10. The closed end 15 of the connector then is placed into a hexagonal socket 32 attached to a square shaft 34 of an electrically or pneumatically powered driver or a manual driver. The power tool then is activated to rotate connector 10 which causes the threaded interior of the aperture 22 to screw onto the stripped ends of the wires twistings the wires together. When the wires have been twisted sufficiently to assure a good electrical connection, the connector 10 is removed from the socket 32. The wire connector remains on the ends of the wires providing electrical insulation for the connection.

In the United States, the Underwriters Laboratory has specified optimum torque levels for attaching different numbers and sizes of electrical wires. Insufficient torque can result in a loose connection which is susceptible to overheating or disconnection, while application of excessive torque can damage the wires or the connector.

As previously noted, electrically or pneumatically powered tools can apply an excessive amount of torque to the connector and break the connector or the wires being fastened. As a consequence, the combination of the wire connector 10 and the tool socket 32 is specifically designed to cooperate and prevent an excessive amount of torque from being applied. That design results in the sharply angled outside corners 38 of the hexagonal connector portion 17 rounding at a predefined torque level allowing the socket 32 to rotate freely about the connector body 12. Thereafter, torque is not transferred to the connector 10 thus limiting the tool to fastening the wire connector to no greater than the desired torque limit. The yielding of the corners 38 on the connector body 12 not only prevents excessive amount of torque from being applied, but also ensures that the predefined torque level is applied as the corners 38 do not yield until that level has been reached.

Figure 3:
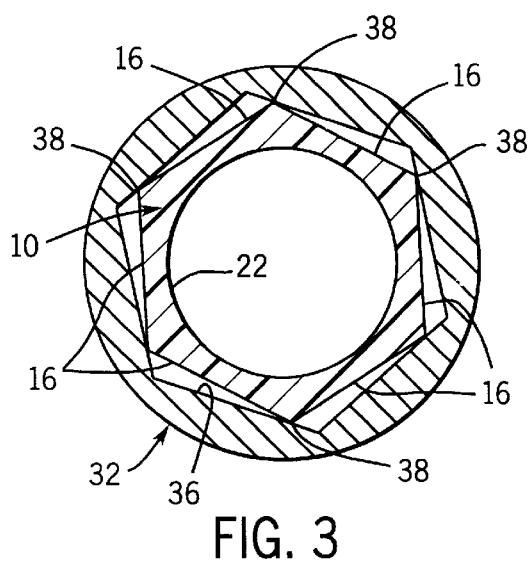
FIG. 3 is a transverse cross-sectional view along line 3—3 in FIG. 2 through the wire connector and the fastening socket assembly.

With reference to FIGS. 2 and 3, the tool socket 32 has a hexagonal cross section aperture 36 within which the closed end 15 of the connector 10 is removably received. The socket aperture 36 is larger than the cross-sectional dimensions of the mating portion of the connector 10 thus producing a loose fit as is particularly evident in FIG. 3. As is apparent in this figure, the torque exerted on the connector 10 by the socket 32 is concentrated at the outside corners 38 of the hexagonal portion 17 of the connector. In conventional fastening operations, it is desirable to have as tight a fit as possible between the tool socket and the object between fastening, in this case the connector 10. That tight fit assures the torque will be distributed through a relatively large surface contact area between the components and prevents the tool socket from turning around the object. However, the present concept intentionally provides less than the normally desired tight fit.

Figure 4:
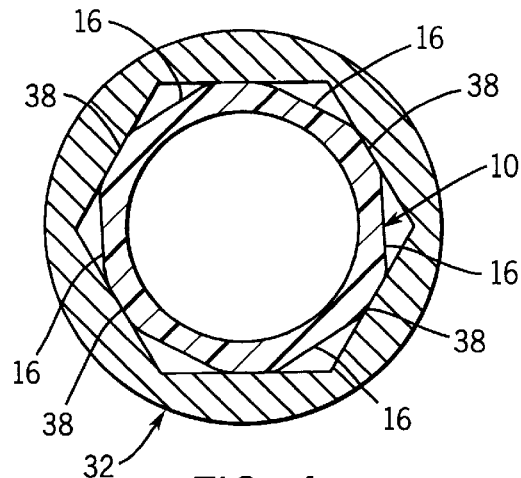
FIG. 4 is a transverse cross-sectional view through the wire connector and the fastening socket after an excessive torque has been applied.

The relatively loose fit between these components is sufficient to for the tool socket 32 to rotate the connector 10 so as to properly couple wires placed within the connector for fastening. When the predefined torque level for the connection is reached, the angled corners 38 of the hexagonal portion 17 of the plastic connector 10 become rounded as depicted in FIG. 4. That predefined torque level is too intense for the relatively small amount of plastic material at the connector corners 38 to withstand without deforming. The deformation continues until the socket 32 is able to rotate freely about the connector 10 at which time transfer of torque to the connector ceases. The difference in cross sectional sizes of the connector 10 and the socket aperture 22 and depth D (FIG. 2) that the connector extends onto the socket aperture determine the area of contact between those components and thus the torque magnitude that must be applied before rounding occurs. The strength of the plastic body 12 also is a factor in determining the torque level at which corner rounding occurs. These factors enable the socket-connector combination to be intentionally designed so that the tool socket 32 can not exert more that the predefined torque level on wire connector 10.

Figure 5:
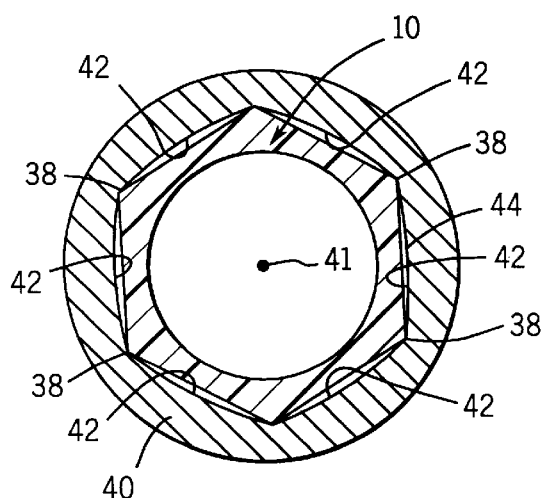
FIG. 5 is a transverse cross-sectional through the wire connector and a second embodiment of a fastening socket according to the present invention.

FIG. 5 illustrates an alternative design of a tool socket 40 which has an aperture that is formed by six concave curved side walls 42. The radius of each side wall is more than twice the distance to the center axis 41 of the socket, for example. Adjacent side walls meet at a line that is parallel to the center axis thus defining an inside corner within which a corner 38 of the connector is received. Because of the curving nature of the side walls, the distance from the center axis 41 to the side walls is greatest at each inside corner and decreases going from an inside corner toward a midpoint 44 along each sidewall 42. Therefore, the hexagonal cross-section portion 17 of the connector 10 is captivated in the aperture so that rotation of the tool socket 40 by the square shaft 34 of the driver will produce rotation of the connector. However, the torque being transferred to from the socket to the connector is concentrated at each outside corner 38 which engages an inside corner of the socket aperture. Thus when the predefined torque limit for this type of connector is exceeded, the corners 38 round allowing the socket to turn freely about the connector. The radius of the side wall curvature defines the area of surface contact between the tool socket 40 and the connector 10, and thus the torque limit at which rounding occurs.

Figure 6:
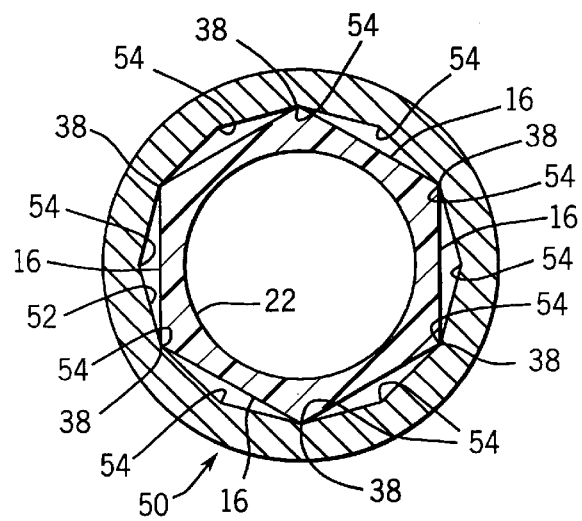
FIG. 6 is a transverse cross-sectional through the wire connector and a third embodiment of a fastening socket according to the present invention.

FIG. 6 illustrates a variation of the socket 40 in FIG. 5. In the third embodiment, socket 50 has an aperture 52 with a dodecagon cross section which by definition has twelve side surfaces and twelve inside corners 54. The six outside corners 38 of the hexagonal cross sectional portion 17 of the connector 10 nest within six of the inside corners 54 with an open inside corner of socket 50 between each inside corner 54 that is engaged by a connector corner 38. The twelve side surfaces of the socket aperture 52 angle away from the six exterior flat surfaces 16 of the connector thus concentrating the applied torque to relatively small surface areas of the connector adjacent to corners 38. This causes the sharply angled connector corners 38 to round when the predefined torque limit is exceeded.

Figure 7:
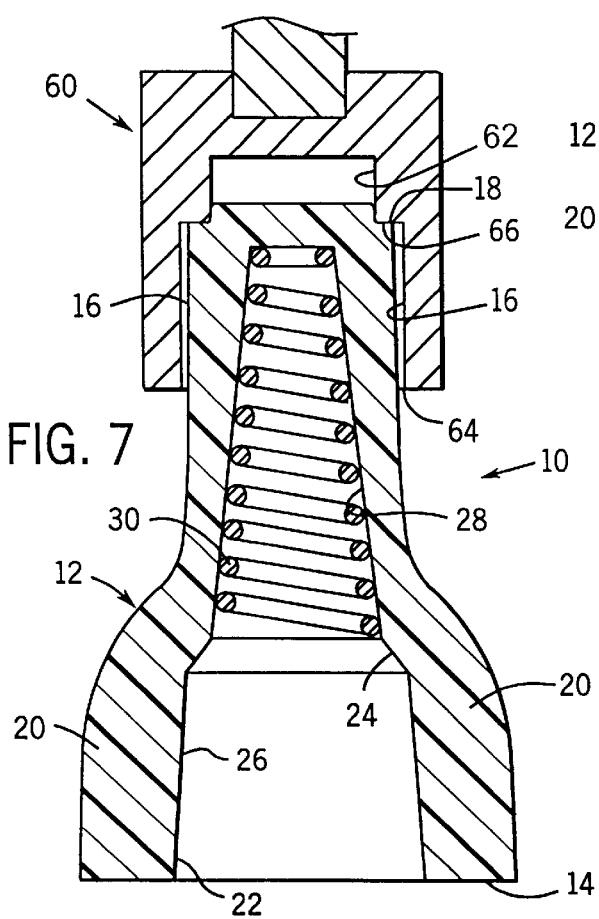
FIG. 7 is an axial cross-sectional view through the wire connector with another type of fastening socket attached thereto.

Another version of a tool socket 60 according to the present invention is shown in FIG. 7. This socket 60 has a hexagonal cross section aperture 62 with a relatively large cross section portion 64 within which the closed end 15 of the connector 10 is removably received. The aperture 62 narrows at a shoulder 66 against which abut the edges 18 of the connector flat surfaces 16. The shoulder 66 defines the depth to which the connector 10 is able to enter the aperture 62 and thus the amount of surface area in which the connector contacts the socket. The torque transferred to the connector 66 and thus the amount of surface area in which the connector contacts the socket. The torque transferred to the connector from the socket during the fastening operation in concentrated in that contact surface area. Therefore by selectively controlling that area with the depth of shoulder 66, the torque level at which the corners of the hexagonal portion of the connector become rounded can be set to the appropriate magnitude for a given fastening operation.

In an variation of the socket 60 in FIG. 7, the portion 64 of aperture 62 is so large in comparison to the cross section of the connector 10 that the socket does not engage the connector flat surfaces 16 or the corners at the meeting point of adjacent flat surfaces. Instead the shoulder 66 has a curved projection which extends into the notches 19 in the edges 18 of the flat surfaces 16. Thus torque is transferred from the socket to the connector through the surfaces of the notches 19. The depth of the notches defines the amount of surface area through which the torque is transferred. By defining that surface area, a limit to the amount of torque that may be applied to the connector can be established. Application of a greater magnitude of torque causes the walls of the notches to deform which results in the socket turning on the end of the connector without further torque transfer.

I claim:

1. A system for joining ends of electrical wires to a predefined torque level, which comprises:

a connector having a hollow body with an open end, a closed end and an outer surface extending between the open and closed ends, and at least a portion of the outer surface having elements which form a cross section with a polygonal shape; and a tool socket having a mechanism by which torque is applied to the tool socket, and having an aperture within which is removably received the closed end of the connector with side walls of the aperture engaging the portion of the outer surface, the aperture being larger in cross section than the connector so that a gap exists between the side walls and the outer surface, as a result of the gap the elements of the connector deform when the tool socket applies greater than the predefined torque level to the connector;

wherein the gap defines the predefined torque level which is great enough for the connector to establish a safe electrical connection between the wires, and is less than a torque level at which damage to the wires or to the connector occurs.

2. The system as recited in claim 1 wherein the portion of the outer surface has a cross section with an equilateral polygonal shape with corner sections.

3. The system as recited in claim 2 wherein the aperture of the tool socket has a cross section with an equilateral polygonal shape with corners.

4. The system as recited in claim 3 wherein upon application of torque, the corners of the tool rotate out of engagement with the corner sections of the connector.

5. The system as recited in claim 2 wherein the aperture of the tool socket has a cross section with the equilateral polygonal shape formed by a plurality of side walls, each side wall abutting adjacent ones of the side walls at two of the corners of the polygonal shape and having an intermediate section between the two of the corners in which the intermediate section is spaced from the connector received in the aperture.

6. The system as recited in claim 1 wherein the portion of the connector has a hexagonal cross section; and the aperture of the tool socket has a hexagonal cross section.

7. The system as recited in claim 1 wherein the portion of the connector has a hexagonal cross section; and the aperture of the tool socket has a dodecagonal cross section.

* * * * *